O. H. Jadwin.

Inkstand.

No. 1,419. Reissued Feb. 24, 1863.

Witnesses.

Gustave Dietrich

Edw. F. Brown

Inventor

Orlando H. Jadwin by his atty.

Mann, Renwick & Adamson

UNITED STATES PATENT OFFICE.

ORLANDO H. JADWIN, OF CARBONDALE, PENNSYLVANIA.

IMPROVEMENT IN INKSTANDS.

Specification forming part of Letters Patent No. 22,123, dated November 23, 1858; Reissue No. 1,419, dated February 24, 1863.

*To all whom it may concern:*

Be it known that I, ORLANDO H. JADWIN, of Carbondale, in the county of Luzerne and State of Pennsylvania, have invented a new and useful Improvement in Fountain-Inkstands; and I do hereby declare the following to be a full and exact description of the construction and operation of the same, reference being had to the accompanying drawings and letters of reference marked thereon, forming a part of this specification, in which—

Figure 1:
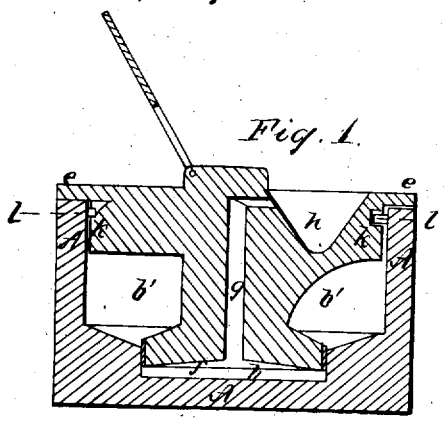
Figure 2:
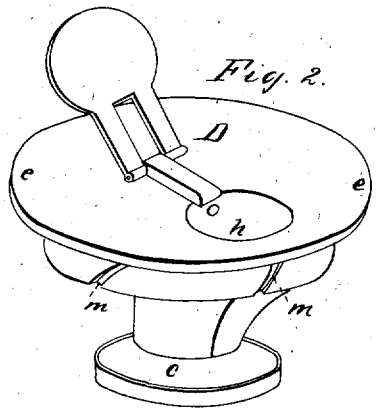

Figure 1 represents a vertical central section through the inkstand, and Fig. 2 a perspective view of the plunger or fountain removed from the reservoir.

I am aware that a tube has been used in an inkstand for conducting up ink from its reservoir into a pen-cup which is a continuation of the opening or channel through said tube, and that this has been done by atmospheric pressure applied to the surface of the ink in the body of the inkstand, but unless the throat of such inkstand be entirely tight the ink will flow back from such cup into the reservoir or bowl, and hence requires a constant manipulation of the fountain-tube to keep the cup supplied.

I am aware that a cut-off tube has been used in an inkstand for conducting up ink from the reservoir into a cup which is a continuation of the opening through said tube, the bottom of the said tube being fitted to come in liquid-tight contact with a small portion of the interior surface of the well of the inkstand, and so prevent the flowing back of the ink from such pen cup into the body or bowl of the inkstand; but in this case, if the bottom of the tube should happen, for any cause, not to come in close contact with the bottom of the inkstand, and if the throat of the inkstand should, for any cause, leak, the air which had been pressed upon the surface of the ink in the bowl in order to force the ink up the tube, this tube will also, under such circumstances, require a constant manipulation in order to keep the pen-cup supplied.

I am also aware that the cup of an inkstand has been supplied by tipping the bowl or reservoir. I do not claim either of these things.

My invention in the main consists, first, in so applying a hollow plunger to the ink-containing bowl of an inkstand that the ink to be used will be forced up through the plunger into a pen-cup by the pressure of the bottom of the plunger upon the ink contained in a chamber in the bottom of the bowl, and, second, in so applying a pen-cup to a plunger that when the ink required for use is forced up into the pen-cup through the plunger it will there remain independent of any action of the plunger upon the bottom of the inkstand, and independent of any atmospheric pressure upon the surface of the ink in the body of the inkstand to hold it in said cup.

Figure 3:
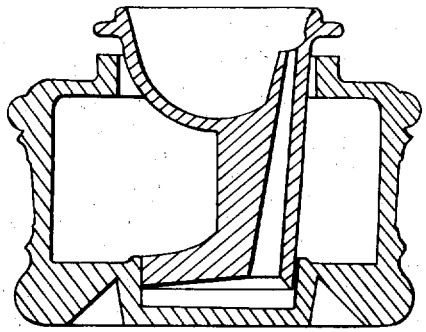
Figure 4:
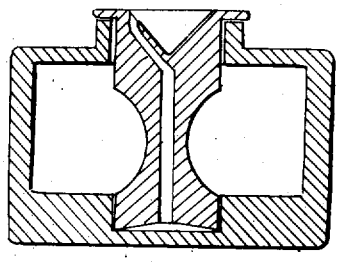

A represents the bowl or reservoir of the inkstand. It may be made of glass or metal, or parts of each, and of any desired shape or form, plain or ornamental. In the bottom of this bowl, on the inside thereof, there is formed a well or chamber, *b*, into which a plunger, *c*, on the lower end of the fountain-plunger D, should snugly fit. This fountain-plunger D may also be of glass or metal, or parts of each, and be made in one piece when made of one material. Its top *e* may be wide enough to cover the whole of the top of the bowl A, or the top of the bowl may be turned inward so as to form flanges, as indicated in Figs. 3 and 4, on, in, or against which the top of the fountain-plunger may rest or be supported, which will admit of the fountain-plunger being made much narrower than shown in Fig. 1. All such forms, changes, or alterations obviously have nothing to do with the principle of the operation of the inkstand, and its mere construction in such regard may be varied to suit the taste, convenience, or fancy of the maker or user. The bottom of the plunger *c* is made with a cavity or concave, as at *f*, and an opening or channel, *g*, is made to connect therewith, which channel leads into a small ink or pen cup or recess, *h*, formed in the top of the fountain-plunger, below the discharge-orifice of the channel *g*, but above the main body of ink in the inkstand, as clearly shown in the figures. Thus the ink when once forced into the pen or ink cup *h* will there remain for use, without any liability to flow back into the stand or bowl, and this independent of any subsequent action of the plunger *c* in the well or chamber *b*, or any atmospheric pressure upon the surface of the ink in the bowl A to sustain or hold it in such cup. The upper portion, *k*, of the fountain-plunger is made to loosely work in the throat of the bowl or shell A of the inkstand, and pins *l*, projecting from the throat of the shell A, are made to freely travel in slots *m* of the fountain-plunger, the width of which slots so far exceed the diameter of the pins and are so formed as to allow the fountain-plunger, when elevated, to drop of its own gravity back to its position, as shown in Fig. 1, the said pins during such act merely serving the purpose of guiding the plunger *c* into the well or chamber *b*. It is manifest, however, that these pins and slots may be dispensed with and that the bottom of the fountain-plunger in its descent may be guided into the well *b* by the hand of the manipulator. This well *b* is made of a capacity sufficient to hold ink enough to charge the pen-cup *h* by a single manipulation of the fountain-plunger, and the plunger *c* fits in the well *b* tight enough to prevent the flow of the ink from the well *b* back into the body *b'* of the bowl A during the act of the depression of the plunger into the well, as well as while said plunger remains stationary therein. The bottom of the plunger *c*, as shown in Figs. 1 and 2, is made concave, or with a cavity, *f*, for the purpose of directing the liquid with a gentle and equable flow to the channel *g*, thereby obviating a squirting action of the ink, which would ensue were the ink to be forced up through a plunger having a plane-faced bottom.

In an inkstand thus constructed it will be seen that the ink which is immediately required to supply or charge the pen-cup is forced from the well *b* up into the said cup by a piston-pressure of the plunger *c* upon the ink in the well; and that, as the upper portion of the fountain-plunger fits loosely into the throat of the inkstand, all liability of the fountain-plunger to be cemented to the bowl by the drying of the ink at such point is obviated. It will also be seen that by my construction of a fountain-inkstand the expansion of air in the bowl A, by reason of a change of temperature, will have no tendency to cause the ink to overflow the pen-cup, as is the case in some fountain-inkstands which are made to supply the pen-cup with ink by means of atmospheric pressure. It is obvious, also, that the first part of my invention will admit of a pen-cup which is a direct continuation of the channel *g* being successfully used.

Having thus described my invention, what I claim as new, and desire to secure by Letters Patent of the United States, is—

1. Supplying ink to the pen-cup of an inkstand solely by means of the pressure of the bottom of a plunger upon the ink to be supplied to said cup.

2. A closely-fitting plunger, *c*, in combination with a well or chamber, *b*, substantially as and for the purpose set forth.

3. In an inkstand, the pen-cup of which is charged by the pressure of the bottom of a plunger upon the ink to be supplied to said cup, forming the bottom of such plunger with a cavity, substantially as and for the purpose set forth.

4. So applying an ink or pen cup to the plunger of a fountain-inkstand that when the pen-cup is charged with ink the ink will remain therein, though the plunger be elevated out of the bowl of the inkstand.

ORLANDO H. JADWIN.

Witnesses:

CHAS. P. JADWIN,
EZRA W. JADWIN.